Sept. 25, 1945.  J. R. CAMPBELL  2,385,606
FLATIRON
Filed June 29, 1943

Inventor:
James R. Campbell,
by Harry E. Dunham
His Attorney.

Patented Sept. 25, 1945

2,385,606

UNITED STATES PATENT OFFICE 2,385,606

FLATIRON

James R. Campbell, Ontario, Calif., assignor to General Electric Company, a corporation of New York Application June 29, 1943, Serial No. 492,693

2 Claims. (Cl. 219—25)

This invention relates to flatirons, more particularly to electrically heated flatirons, and it has for its object the provision of a device of this character having improved temperature control means.

More specifically, this invention contemplates the provision of an improved electrically heated flatiron provided with thermostatic means responsive to the soleplate temperature for controlling the heating means to hold a substantially constant temperature in the soleplate, together with the temperature responsive means positioned remotely from the soleplate for regulating the controlling action of the soleplate thermostatic means.

In accordance with this invention in one form thereof, a thermostatic member is situated close to the soleplate so as to respond to its temperature. This member is constructed and arranged to control the heating unit of the soleplate so as to control the temperature held in the soleplate. Auxiliary means are provided for supplying heat to the thermostatic member in addition to that supplied to it from the soleplate. This auxiliary means is controlled by means of a second thermostat remotely situated with reference to the soleplate so that it is not affected by its temperature. This remotely situated thermostat in turn is provided with heating means for controlling its operation so that it alternately causes the auxiliary heating means to apply heat to and cut it off from the soleplate thermostat. By adjusting the action of the remotely situated thermostat, the amount of auxiliary heat supplied to the soleplate thermostat is controlled, and hence the temperature of the soleplate itself is controlled. This is because the amount of heat supplied by the soleplate to cause the action of its thermostat will depend upon the amount of auxiliary heat supplied. Thus, a low soleplate temperature results when a relatively great amount of auxiliary heat is applied to the soleplate thermostat by the auxiliary heater, and a high soleplate temperature results when a relatively small quantity of heat is applied by the auxiliary heater.

Figure 1:
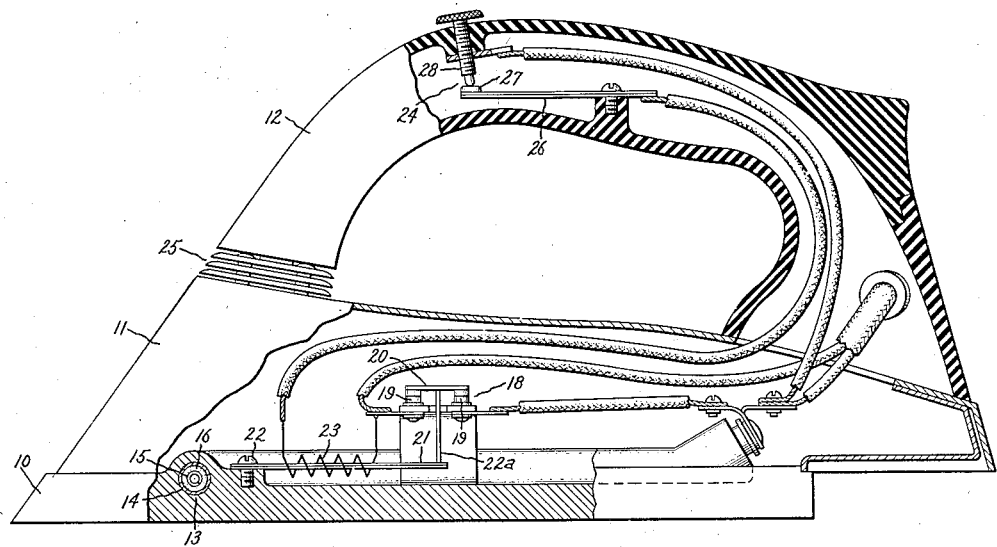
Figure 2:
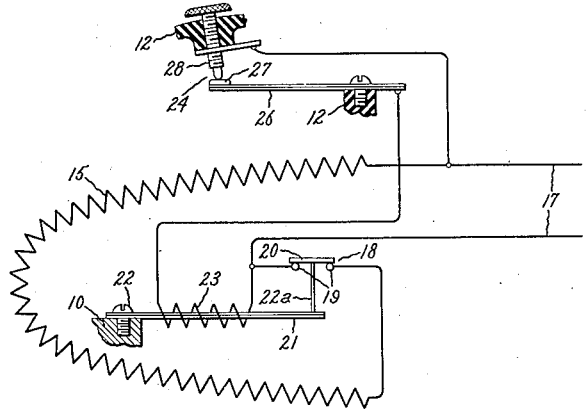

For a more complete understanding of this invention, reference should be had to the accompanying drawing in which Fig. 1 is a side elevation, mainly in section illustrating a flatiron embodying this invention; and Fig. 2 is a diagrammatic representation of the heating means for the flatiron and the temperature control means provided for its embodying this invention.

Referring to the drawing, this invention has been shown in one form as applied to an electrically heated flatiron comprising a pressing soleplate 10, a shell 11 above the soleplate, and a handle 12 fastened to the shell. The soleplate 10 is heated by an electrical heating element 13, which preferably will be of the sheathed type comprising an outer sheath 14 housing a helical resistance conductor 15, and which conductor is held in spaced relation with reference to the sheath by a highly compacted mass 16 of heat conducting, electrically insulating material, such as powdered magnesium oxide. Preferably, the heating element 13 will be cast in the soleplate 10, as shown.

As shown diagrammatically in Fig. 2, the heating element 13 will be energized from a suitable electrical source of supply 17. Interposed in the energizing circuit of the heater 13 which connects it with the supply source is a suitable control switch 18 comprising a pair of spaced fixed contacts 19 and a movable bridging contact 20, the parts being arranged so that when the bridging contact is in its open position the heating element 13 is deenergized, whereas when it is in its closed position the heating element is energized.

The operation of the bridging contact 20 between its closed and open positions is effected by means of a bimetallic temperature responsive element 21 which is in the form of an elongated bar having its left-hand end, as viewed in the drawing, rigidly secured to the soleplate in direct thermal relation with it as by means of a clamping member 22. The remainder of the bar is free to move responsively to temperature changes, and the free end thereof carries an actuating support 22a for the bridging contact 20, as shown. It will be understood that a bimetallic bar of this nature is formed by securing two pieces of metal together lengthwise from end to end, the two pieces having different thermal coefficients of expansion so that the bar moves up and down with reference to the soleplate as its temperature changes. The bar illustrated curves upwardly, as viewed in Fig. 1, as its temperature is elevated and curves downwardly when its temperature is reduced.

In addition to the heat which the bar 21 receives from the soleplate, I provide an auxiliary heating means 23 for applying heat to the bar. This auxiliary heating means is in the form of a resistance conductor wound directly on the bar, but electrically insulated from it by any suitable means (not shown).

The energization of this auxiliary heater 23 is controlled by means of a thermally responsive device 24 remotely situated with reference to the soleplate. In the specific example shown in Fig. 1, it is mounted in the handle 12. This handle 12 preferably will be formed of a suitable phenolic condensation product; and preferably, a suitable heat baffle 25 will be interposed between the forward end of the shell and the forward standard of the handle, while the rear standard also preferably will have a small heat contact with the shell. The hand grip portion of the handle, as shown, is hollow and in this hollow section is located the temperature responsive device 24. This device 24 comprises a second bimetallic bar 26 which in general is of the same character as the bimetallic bar 21. The right-hand end of this bar, as viewed in Fig. 1, is anchored to the handle while the remainder of the bar is free to move up and down in response to temperature changes. This bar when heated curves downwardly and when cooled curves upwardly. The free end of this bar carries a contact 27 which coacts with an adjustable contact 28 shown in the form of a screw mounted in the handle above the contact 27, and the bar is normally flexed upwardly so as to bias the contact 27 into engagement with the contact 28. This bar also is provided with local heating means, but here, the bar constitutes its own heater—being heated by its resistance to the passage of current, rather than being heated by a separate heater.

The various elements of the control are connected as shown diagrammatically in Fig. 2. Preferably, the rear standard of the handle will be hollow, as well as the hand-gripping part, and the connections between the supply source and the heating element and also those between the auxiliary heater 23 and the remotely situated thermal control element 24 will be directed through the hollow handle, as shown.

In the operation of the system, it will be understood that when the iron is "plugged in" to the supply source 17, the switch 18 and the control switch 27, 28 initially will be closed. Therefore, when the iron is "plugged in," the heating element 15 will be energized by a circuit which may be traced from the upper conductor of the supply source (Fig. 2) through the heating element, and thence through the closed contacts 19 to the lower conductor of the supply source 17. Also, the auxiliary heater 23 will be energized through contacts 27 and 28 from the supply source. Therefore, the thermal bar 21 will receive heat both from the soleplate 10 and from the auxiliary heater 23, and when its temperature attains a predetermined high value it will open the bridging contact 20 to deenergize the soleplate heating element 13; the soleplate thereupon will cool down and ultimately permit the thermostat 21 to cool sufficiently to reclose the switch 19 so as to reenergize the heating element 13.

The high temperature that the soleplate 10 attains before heating the thermostat 21 to open its energizing circuit will, of course, depend upon the amount of auxiliary heat supplied by the heater 23. If this heater supplies a great quantity of heat, then but a very small amount will be supplied by the soleplate 10 before the energizing circuit of the iron is opened, and consequently, the soleplate operating temperature will be relatively low; whereas if but a very small amount of heat be supplied by the auxiliary heater 23, then a greater quantity of heat has to be supplied by the soleplate in order to actuate the thermostat and the soleplate operates at a higher temperature.

The amount of heat supplied by the auxiliary heater 23 is controlled by the opening and closing actions of the thermostat 26, and this operation depends upon its heating due to its own resistance to the flow of current in the circuit of the auxiliary heater 23. In other words, when the circuit through the thermal element 26 is completed, thereafter in a predetermined interval of time it will function to open the switch contacts 27 and 28 and thereby open and deenergize the auxiliary heater 23; following this the element 26 will cool down and reclose the contacts 27 and 28 in order to reenergize the heater 23. The proportion of time that energy is supplied to the heater 23 to the proportion of time that it is not supplied determines the quantity of auxiliary heat that is supplied to the thermostat 21, and as will be understood this proportionality depends upon the proportion of time that the secondary thermostat 26 keeps the contacts 27 and 28 closed to the time that it holds them open. This latter operation is controlled by adjusting the position of the fixed contact 28; if this contact 28 be moved upwardly, the proportion of time that heat is "on" is reduced, whereas if it be adjusted downwardly, the proportion of time heat is "on" is increased. In other words, the adjustment of the fixed contact 28 controls the quantity of current supplied to the auxiliary heater 23 in a given period of time. If this quantity is increased, the soleplate will operate at a lower temperature, whereas if it is reduced the soleplate will operate at a higher temperature.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A flatiron comprising a soleplate, a handle for operating said soleplate having a chamber therein thermally remotely situated with reference to said soleplate, a heating unit for applying heat to said soleplate, a thermally responsive member responsive to the temperature of said soleplate controlling said heating unit to control the temperature of said soleplate, auxiliary means for heating said temperature responsive member, a second temperature responsive member positioned within said chamber of said handle out of the thermal influence of said soleplate and operative to control said auxiliary heating means, and means for heating said second temperature responsive member controlled by it so that it alternately applies heat to and cuts off heat from said member, said second temperature responsive member thereby controlling said auxiliary heating means alternately to supply heat to and cut it off from said first-named temperature responsive member, and means for adjusting said second temperature responsive member to control the proportion of time that heat is applied to it to the time that heat is cut off from it.

2. A flatiron comprising a soleplate, a handle for operating said soleplate, an electric heating element for applying heat to said soleplate, a bimetallic element in thermal relation with said soleplate, switching means controlled by said bimetallic element for controlling the energization of said heating element to hold a substantially constant temperature in said soleplate, an auxiliary heater for applying heat to said bimetallic element in addition to the heat which is supplied to it from said soleplate, and a control device for said auxiliary heater located within said handle, comprising a second bimetallic element, switch means operated by said second bimetallic element, an energizing circuit for said auxiliary heater, independent of the circuit of said soleplate, and including said switch means, heating means controlled by said second bimetallic element for heating it to a predetermined high temperature to open said switch means to deenergize said circuit and shut off said heating means, and said second bimetallic element then cooling to reclose said switch means to reenergize said circuit and operate said heating means to again apply heat to it, said second thermostatic element thereby controlling the amount of heat energy supplied by said auxiliary heater to said first bimetallic element, and means for adjusting the switch means operated by said second bimetallic element in order to vary the proportion of time that heat is supplied by said auxiliary heater to said first bimetallic element to the time that heat is not supplied so as to vary the temperature setting of said first bimetallic element.

JAMES R. CAMPBELL.